US010527159B2

(12) United States Patent
Takeuchi

(10) Patent No.: US 10,527,159 B2
(45) Date of Patent: Jan. 7, 2020

(54) CONTROL DEVICE OF HYBRID VEHICLE

(71) Applicant: TOYOTA JIDOSHA KABUSHIKI KAISHA, Toyota-shi, Aichi (JP)

(72) Inventor: Tomoya Takeuchi, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 206 days.

(21) Appl. No.: 15/873,666

(22) Filed: Jan. 17, 2018

(65) Prior Publication Data
US 2018/0209534 A1    Jul. 26, 2018

(30) Foreign Application Priority Data

Jan. 26, 2017    (JP) .................................. 2017-012503

(51) Int. Cl.
*B60K 6/445* (2007.10)
*F16H 63/48* (2006.01)
(Continued)

(52) U.S. Cl.
CPC ............. *F16H 59/54* (2013.01); *B60K 6/445* (2013.01); *B60L 15/2054* (2013.01);
(Continued)

(58) Field of Classification Search
CPC ...... F16H 59/54; F16H 61/0293; F16H 59/70; F16H 63/48; B60W 10/08; B60W 20/15; B60W 20/30; B60W 10/182; B60W 2710/188; B60W 2710/083; B60W 2550/142; B60W 2510/0642; B60W 20/17; B60K 6/445; B60K 6/36; B60K 6/365;
(Continued)

(56) References Cited

U.S. PATENT DOCUMENTS 5,934,395 A * 8/1999 Koide ................... B60W 20/15
                                                180/65.235
2003/0154945 A1    8/2003 Ando et al.
(Continued)

FOREIGN PATENT DOCUMENTS

JP    2003-247438 A    9/2003
JP    2004-254434 A    9/2004
(Continued)

*Primary Examiner* — Jacob S. Scott
*Assistant Examiner* — Lillian T Nguyen
(74) *Attorney, Agent, or Firm* — Oliff PLC

(57) ABSTRACT

A hybrid vehicle control device has: a determining portion determining, during idle engine operation, whether a meshing state is achieved in which the lock member is meshed with the parking gear, or a non-meshing state is achieved in which the lock member is not meshed with the parking gear; and a control portion providing a control of applying the running electric motor torque to the rotary member to eliminate a gap in a meshing portion between gears in the power transmission system and a gap in a meshing portion between the parking gear and the lock member when it is determined that the meshing state is achieved, and providing a control of applying a torque of the differential electric motor to the rotary member to eliminate a gap in the meshing portion between gears in the power transmission system when it is determined that the non-meshing state is achieved.

6 Claims, 7 Drawing Sheets

(51) Int. Cl.

| | | |
|---|---|---|
| *F16H 59/54* | (2006.01) | |
| *F16H 61/02* | (2006.01) | |
| *B60L 15/20* | (2006.01) | |
| *B60W 20/30* | (2016.01) | |
| *B60W 20/15* | (2016.01) | |
| *B60W 10/08* | (2006.01) | |
| *F16H 59/70* | (2006.01) | |
| *B60K 6/36* | (2007.10) | |
| *F02D 29/02* | (2006.01) | |

(52) U.S. Cl.
CPC ............ *B60W 10/08* (2013.01); *B60W 20/15* (2016.01); *B60W 20/30* (2013.01); *F16H 61/0293* (2013.01); *B60K 6/36* (2013.01); *F02D 29/02* (2013.01); *F16H 59/70* (2013.01)

(58) Field of Classification Search
CPC .......... F02D 29/02; F02D 41/08; B60L 58/24; B60L 58/12; B60L 50/16; B60L 50/61; B60L 15/2009; B60L 15/2054; B60L 7/18; B60L 2270/142; B60L 2240/545; B60L 2240/441; B60L 2240/423; B60L 2240/421; B60L 2240/12; B60L 2240/30; Y02T 10/6239; Y02T 10/7275; Y02T 10/7077; F02N 11/0829; F02N 11/0818
See application file for complete search history.

(56) References Cited

U.S. PATENT DOCUMENTS

2005/0082096 A1\* 4/2005 Oono ..................... B60K 6/445
180/65.235
2013/0268153 A1 10/2013 Ando et al.
2014/0155214 A1\* 6/2014 Kimura .................. B60L 50/16
475/160

FOREIGN PATENT DOCUMENTS

| JP | 2012-218622 A | 11/2012 |
|---|---|---|
| JP | 2013-203325 A | 10/2013 |
| WO | 2012/086022 A1 | 6/2012 |

\* cited by examiner

MESHING STATE

NON-MESHING STATE

CONTROL DEVICE OF HYBRID VEHICLE

This application claims priority from Japanese Patent Application No. 2017-012503 filed on Jan. 26, 2017, the disclosure of which is herein incorporated by reference in its entirety.

TECHNICAL FIELD

The present invention relates to suppression of rattling occurring in a hybrid vehicle when an engine is in an idle operation and a shift position of a power transmission device is at a parking position.

BACKGROUND ART

A hybrid vehicle is known that includes a differential mechanism distributing a power from an engine to a differential electric motor and drive wheels, a rotary member transmitting a power from the differential mechanism to the drive wheels, and a running electric motor coupled in a power transmittable manner between the rotary member and the drive wheels and that is provided with a parking gear preventing rotation in a power transmission system from the rotary member to the drive wheels when a shift position of a power transmission device is at a parking position since a lock member is meshed with the rotary member. This corresponds to the hybrid vehicles described in Patent Documents 1 and 2. In the hybrid vehicles described in Patent Documents 1 and 2, it is known that when the shift position is the parking position and the engine is in an idle operation state, tooth flanks of gears repeatedly collide with and separate from each other, i.e., so-called rattling occurs, in a meshing portion between the gears in the power transmission system and a meshing portion between the parking gear and the lock member due to torque fluctuation of the engine. In Patent Documents 1 and 2, to suppress such rattling, it is proposed to apply a torque to the rotary member by the running electric motor so as to eliminate a gap, i.e., to perform so-called backlash elimination, in these meshing portions.

PRIOR ART DOCUMENT

Patent Document 1: JP-2004-254434A
Patent Document 2: JP-2012-218622A

SUMMARY OF THE INVENTION

Technical Problem

In the hybrid vehicles of Patent Documents 1 and 2, the torque of the differential electric motor is zero during the idle operation of the engine with the shift position set to the parking position, and when a torque is applied to the rotary member by the running electric motor to perform the backlash elimination, the rotation of the rotary member is blocked by meshing of the parking gear with the lock member, so that a torque reaction force of the running electric motor is received by the lock member. However, the lock member may not be meshed with the parking gear so that a non-meshing state may occur depending on a rotation stop position of the parking gear, and in this case, since the torque reaction force cannot be received by the lock member, backlash elimination is difficult to be performed.

The present invention was conceived in view of the situations and it is therefore an object of the present invention to provide a control device of a hybrid vehicle capable of suppressing a gear rattle noise due to rattling occurring when the shift position is set to the parking position during idle operation of the engine.

Solution to Problem

According to a first aspect of the invention, there is provided a control device of a hybrid vehicle that includes a differential mechanism distributing a power from an engine to a differential electric motor and drive wheels, a rotary member transmitting a power from the differential mechanism to the drive wheels, and a running electric motor coupled in a power transmittable manner between the rotary member and the drive wheels and that is provided with a parking gear preventing rotation in a power transmission system from the rotary member to the drive wheels when a shift position is at a parking position since a lock member is meshed with the parking gear, the control device comprising: a determining portion determining, during idle operation of the engine with the shift position set to the parking position, whether a meshing state is achieved in which the lock member is meshed with the parking gear, or a non-meshing state is achieved in which the lock member is not meshed with the parking gear; and a control portion providing a control of applying a torque of the running electric motor to the rotary member to eliminate a gap in a meshing portion between gears in the power transmission system and a gap in a meshing portion between the parking gear and the lock member when it is determined that the meshing state is achieved, and providing a control of applying a torque of the differential electric motor to the rotary member to eliminate a gap in the meshing portion between gears in the power transmission system when it is determined that the non-meshing state is achieved.

According to a second aspect of the invention, the control device of a hybrid vehicle according to the first aspect of the invention is configured such that the determining portion calculates a rotation angle of the rotary member based on a rotation angle of the running electric motor and determines whether the meshing state or the non-meshing state is achieved based on the rotation angle of the rotary member.

According to a third aspect of the invention, the control device of a hybrid vehicle according to the first or second aspect of the invention further comprises a learning portion learning a rotation angle of the rotary member at which the perking gear and the lock member enter the meshing state, based on a rotation angle of the rotary member when the vehicle stops with the shift position set to the parking position on uphill and downhill roads.

According to a fourth aspect of the invention, the control device of a hybrid vehicle according to the third aspect of the invention is configured such that the learning portion corrects the rotation angle of the rotary member at which the parking gear and the lock member enter the meshing state, depending on a road surface gradient of the uphill and downhill roads.

According to a fifth aspect of the invention, the control device of a hybrid vehicle according to any one of the first to fourth aspects of the invention is configured such that when it is determined that the parking gear and the lock member are in the meshing state, the control portion varies the torque applied from the running electric motor in consideration of rigidity of the rotary member and a gap in the meshing portion between the parking gear and the lock member.

According to a sixth aspect of the invention, the control device of a hybrid vehicle according to any one of the first to fifth aspects of the invention further comprises a braking control portion actuating a braking device for inhibiting movement of the vehicle while the torque of the running electric motor or the differential electric motor is applied to the rotary member.

Advantageous Effects of the Invention

According to the control device of the hybrid vehicle recited in the first aspect of the invention, although the backlash cannot be eliminated in the meshing portion between the gears in the power transmission system in the non-meshing state by applying the torque to the rotary member by the running electric motor and the backlash cannot be eliminated in the meshing portion between the parking gear and the lock member in the meshing state by applying the torque to the rotary member by the differential electric motor, the electric motor applying the torque to the rotary member can be switched depending on whether the parking gear and the lock member are in the meshing state or the non-meshing state, so as to properly eliminate the backlashes in the meshing portion between the gears in the power transmission system and in the meshing portion between the parking gear and the lock member and to properly suppress the gear rattle noise due to rattling.

According to the control device of the hybrid vehicle recited in the second aspect of the invention, the rotation angle of the rotary member can be calculated by detecting the rotation angle of the running electric motor without adding a sensor etc. for detecting the rotation angle of the rotary member, and it can be determined whether the parking gear and the lock member are in the meshing state or the non-meshing state, based on the rotation angle of the rotary member.

According to the control device of the hybrid vehicle recited in the third aspect of the invention, when the vehicle stops with the shift position set to the parking position on uphill and downhill roads, the rotation angle of the rotary member resulting in the meshing state between the parking gear and the lock member is learned based on the rotation angle of the rotary member at that time, and therefore, even when an amount of backlash has changed due to gear wear etc., the rotation angle of the rotary member resulting in the meshing state is newly learned, so that whether the parking gear and the lock member are in the meshing state or the non-meshing state can accurately be determined regardless of temporal changes.

According to the control device of the hybrid vehicle recited in the fourth aspect of the invention, considering the fact that the rotation angle resulting in the meshing state between the parking gear and the lock member varies depending on the road surface gradient of the uphill and downhill roads, the rotation angle of the rotary member resulting in the meshing state between the parking gear and the lock member is corrected depending on the road surface gradient, so that the accuracy can further be improved in determination on whether the parking gear and the lock member are in the meshing state or the non-meshing state.

According to the control device of the hybrid vehicle recited in the fifth aspect of the invention, when it is determined that the parking gear and the lock member are in the meshing state, the torque of the running electric motor is varied in consideration of the rigidity of the rotary member and the gap in the meshing portion between the parking gear and the lock member, so that the torque of the running electric motor can be minimized within the range in which rattling is suppressed, so as to reduce deterioration in fuel consumption due to the backlash elimination.

According to the control device of the hybrid vehicle recited in the sixth aspect of the invention, while the torque of the running electric motor or the differential electric motor is applied to the rotary member, the braking device for inhibiting the vehicle movement is actuated, so that the vehicle can be prevented from moving against an intention of a driver.

MODES FOR CARRYING OUT THE INVENTION

An example of the present invention will now be described in detail with reference to the drawings. In the following example, the figures are simplified or deformed as needed and portions are not necessarily precisely drawn in terms of dimension ratio, shape, etc.

EXAMPLE

Figure 1:
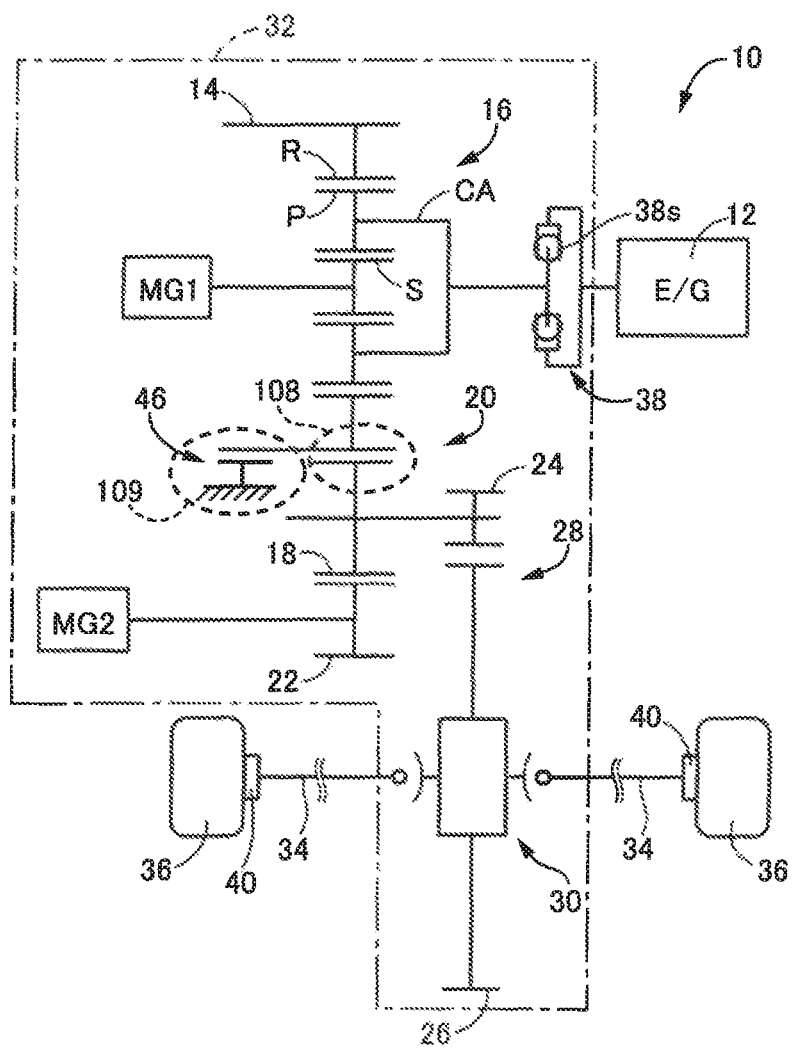
FIG. 1 is a skeleton diagram for explaining a schematic configuration of a hybrid vehicle to which the present invention is applied.

FIG. 1 is a skeleton diagram for explaining a schematic configuration of a hybrid vehicle 10 (hereinafter referred to as a vehicle 10) to which the present invention is applied. In FIG. 1, the vehicle 10 includes an engine 12 as a drive source for running, and a power transmission device 32. The power transmission device 32 includes a power distribution mechanism 16 for distributing a power output from the engine 12 to a first electric motor MG1 and a counter drive gear 14 (hereinafter, a drive gear 14), a counter gear pair 20 made up of the drive gear 14 and a counter driven gear 18 (hereinafter referred to as a driven gear 18) meshed with the drive gear 14, a second electric motor MG2 coupled to the driven gear 18 via a reduction gear 22 in a power transmittable manner, a final gear pair 28 made up of a differential drive gear 24 and a differential driven gear 26, a differential gear device 30 (final reduction gear), and a pair of right and left axles 34. The power transmission device 32 is suitably used in an FF (front-engine front-drive) type vehicle having a transverse engine as the engine 12. The driven gear 18 and the differential drive gear 24 are configured to integrally rotate. The drive gear 14 corresponds to a rotary member of the present invention; the power distribution mechanism 16 corresponds to a differential mechanism of the present invention; the first electric motor MG1 corresponds to a differential electric motor of the present invention; and the second electric motor MG2 corresponds to a running electric motor of the present invention.

In the power transmission device 32 configured in this way, the power of the engine 12 is transmitted via the power distribution mechanism 16 and the drive gear 14 to the driven gear 18, while the power of the second electric motor MG2 is transmitted via the reduction gear 22 to the driven gear 18, and these power is transmitted from the driven gear 18 sequentially through the final gear pair 28, the differential gear device 30, the pair of the right and left axles 34 (drive shaft, D/S) to a pair of right and left drive wheels 36.

A damper device 38 is disposed between the engine 12 and the power distribution mechanism 16. The damper device 38 includes a damper spring 38s, and has a function in which torque fluctuation is absorbed by the damper spring 38s appropriately twisted depending on an input torque. The drive wheels 36 are provided with brake devices 40. The brake device 40 generates a brake force Fbr (braking force) corresponding to a force of depression of a foot brake pedal 90 (see FIG. 3) by a driver. The brake device 40 also can generate the brake force Fbr which is controlled based on a command signal from an electronic control device 80 (see FIG. 3). The brake device 40 corresponds to a braking device of the present invention.

The power distribution mechanism 16 is made up of a known single pinion gear type planetary gear device including as rotary elements a sun gear S, a pinion gear P, a carrier CA supporting the pinion gear P in a rotatable and revolvable manner, and a ring gear R meshing via the pinion gear P with the sun gear S. The sun gear S is coupled to the first electric motor MG1 in a power transmittable manner, the carrier CA is coupled to the engine 12 in a power transmittable manner, and the ring gear R is coupled to the drive gear 14 in a power transmittable manner. As a result, since the sun gear S, the carrier CA, and the ring gear R are made rotatable relative to each other, the power of the engine 12 is distributed to the first electric motor MG1 and the drive gear 14 while the first electric motor MG1 generates an electric energy from the power of the engine 12 distributed to the first electric motor MG1, and the generated electric energy is accumulated via an inverter 72 (see FIG. 3) into an electric storage device 74 (see FIG. 3), or the second electric motor MG2 is rotationally driven by the generated electric energy. This puts the power distribution mechanism 16 into, for example, a continuously variable transmission state (electric CVT state) to function as an electric continuously variable transmission in which a rotation speed of the ring gear R coupled to the drive gear 14 is continuously varied regardless of a predetermined rotation speed of the engine 12. In other words, the power distribution mechanism 16 and the power transmission device 32 including the power distribution mechanism 16 act as an electric differential portion (electric continuously variable transmission) with a differential state of the power distribution mechanism 16 controlled by controlling an operating state of the first electric motor MG1 acting as a differential electric motor. In this example, the ring gear R of the power distribution mechanism 16 formed on the inner circumferential side and the drive gear 14 formed on the outer circumferential side are integrally formed as a composite gear.

Figure 2:
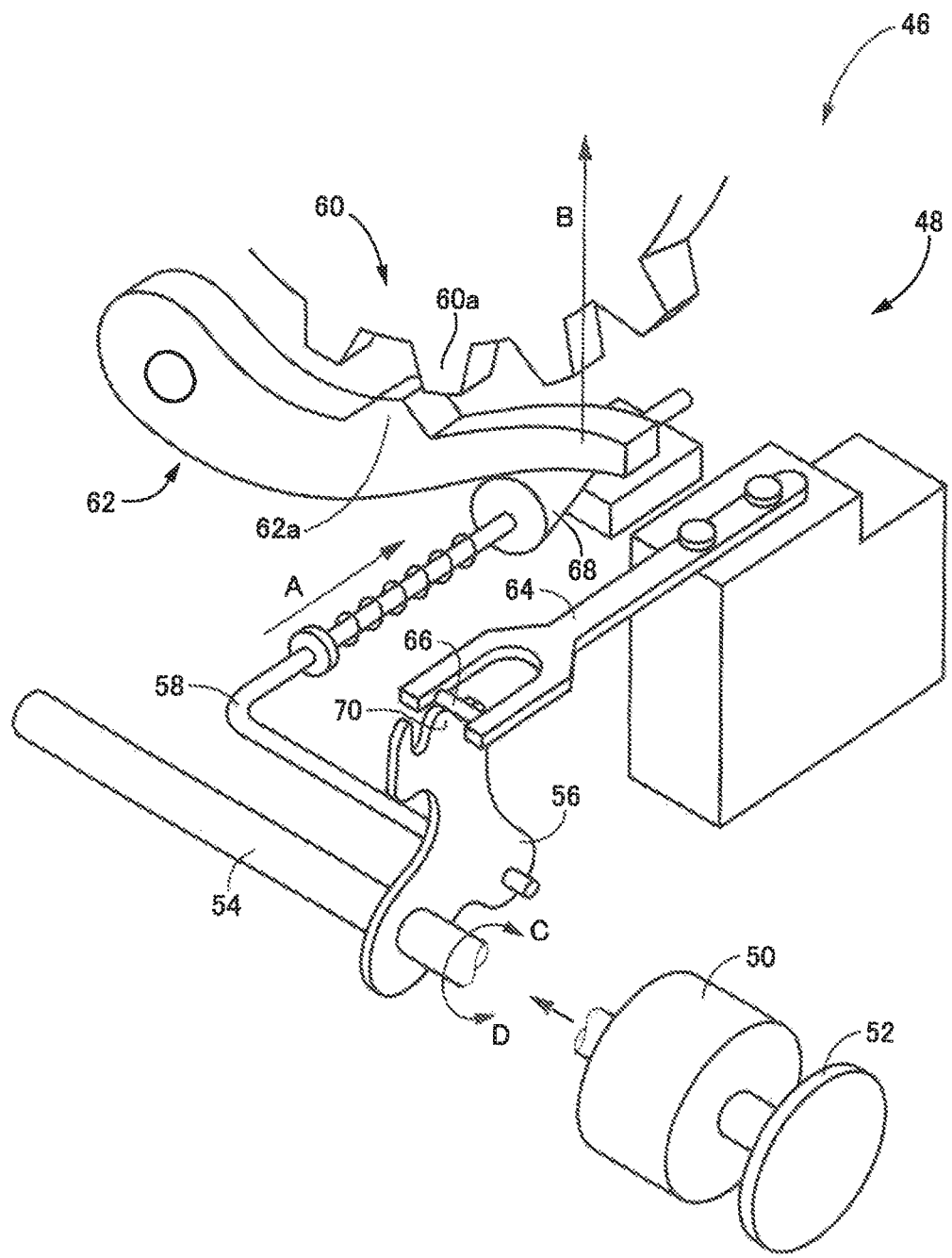
FIG. 2 is a diagram for explaining a structure of a parking lock device in FIG. 1.

A parking lock device 46 is also disposed for stopping the rotation of the drive gear 14 to stop the vehicle 10 when a shift operation position Psh of a shift lever 102 (see FIG. 3) is operated to a parking position (P position). FIG. 2 is a diagram for explaining a structure of the parking lock device 46. The parking lock device 46 includes a P-lock mechanism 48, a P-lock drive motor 50, an encoder 52, etc., and operates to inhibit the movement of the vehicle 10 based on a control signal from the electronic control device 80 described later.

The P-lock drive motor 50 is constituted by a switched reluctance motor (SR motor), for example, and drives the P-lock mechanism 48 in response to a command from the electronic control device 80. The encoder 52 integrally rotates with the P-lock drive motor 50 and outputs to the electronic control device 80 a pulse signal for acquiring a count value corresponding to the movement amount of the P-lock drive motor 50.

The P-lock mechanism 48 includes a shaft 54 rotationally driven by the P-lock drive motor 50, a detent plate 56 rotated according to the rotation of the shaft 54 to function as a P-lock positioning member for switching between a P-lock position corresponding to the P position and a non-P-lock position corresponding to shift positions (non-P positions) other than the P position, a rod 58 operated according to the rotation of the detent plate 56, a parking gear 60 integrally disposed to be side-by-side with the outer circumferential teeth of the drive gear 14 and made up of a plurality of teeth 60a rotating in conjunction with the drive wheels 36, a parking lock pole 62 (hereinafter referred to as a lock pole 62) for blocking (for locking) the rotation of the parking gear 60, a detent spring 64 for regulating the rotation of the detent plate 56, and a roller 66 disposed on the detent spring 64. The lock pale 62 corresponds to a lock member of the present invention.

FIG. 2 shows a state when the P-lock mechanism 48 is placed in the non-P-lock position. In this state, since the lock pole 62 does not lock the parking gear 60, or specifically, a tooth 62a of the lock pole 62 is not meshed with the teeth 60a of the parking gear 60, the rotation of the drive wheels 36 is not blocked by the P-lock mechanism 48. When the shift operation position Psh is switched from this state to a P-operation position, the shaft 54 is rotated in a direction of an arrow C by the P-lock drive motor 50, and the rod 58 is pushed in a direction of an arrow A, so that the lock pole 62 is pushed up in a direction of an arrow B by a conical tapered member 68 disposed at a tip of the rod 58. As the detent plate 56 rotates, the roller 66 of the detent spring 64 located at the non-P-lock position climbs over a protrusion 70 and moves to the P-lock position. When the detent plate 56 rotates until the roller 66 moves to the P-lock position, the tooth 62a of the lock pole 62 is pushed up to a position of meshing with the teeth 60a of the parking gear 60. As a result, the rotation of the parking gear 60 (and the drive gear 14) is mechanically blocked. As described above, when the shift operation position Psh is at the P-operation position, the parking gear 60 is meshed with the lock pole 62, so that rotation in a power transmission path (power transmission system) from the drive gear 14 to the drive wheels 36 is mechanically inhibited.

Figure 3:
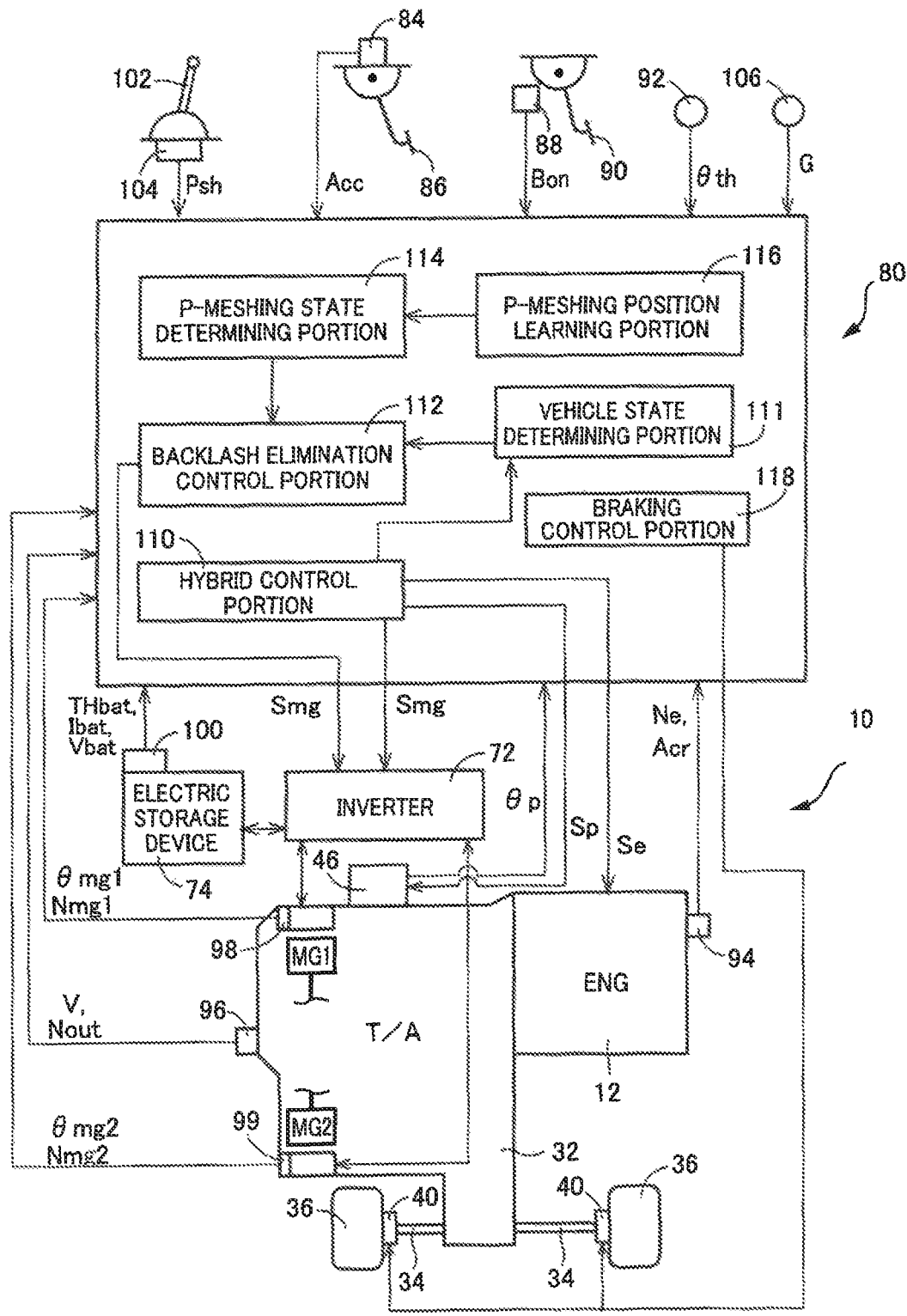
FIG. 3 is a functional block diagram for explaining a main portion of a control function of an electronic control device controlling portions of the vehicle shown in FIG. 1.

FIG. 3 is a functional block diagram for explaining a main portion of the control function of the electronic control device 80 controlling portions of the vehicle 10. The electronic control device 80 includes a so-called microcomputer including a CPU, a RAM, a ROM, an I/O interface, etc. The CPU executes signal processes in accordance with programs stored in advance in the ROM, while utilizing a temporary storage function of the RAM, to provide various controls of the vehicle 10. For example, the electronic control device 80 provides vehicle control including hybrid control related to the engine 12, the first electric motor MG1, and the second electric motor MG2, switching control of an actuation state of the parking lock device 46, etc., and is configured separately as needed for output control of the engine 12, control of the power transmission device 32 (for electric motor control of the first electric motor MG1 and the second electric motor MG2), the switching control of the parking lock device 46, etc.

The electronic control device 80 is supplied with each of signals including: a signal indicative of the shift operation position Psh of the shift lever 102 detected by a shift position sensor 104; a signal indicative of an accelerator opening degree Acc that is an operation amount of an accelerator pedal 86 serving as an amount of acceleration request to the vehicle 10 by a driver detected by an accelerator opening degree sensor 84; a signal indicative of an operation (brake-on) Bon of the foot brake pedal 90 indicating that a foot brake, i.e., a service brake, is being operated (being subjected to a depression operation) detected by a brake switch 88; a signal indicative of a throttle valve opening degree θth that is an opening degree of an electronic throttle valve detected by a throttle valve opening degree sensor 92; signals indicative of a rotation angle Acr of a crankshaft and indicative of an engine rotation speed Ne that is a rotation speed of the engine 12, detected by a crank position sensor 94; a signal indicative of an output rotation speed Nout that is a rotation speed of the driven gear 18 corresponding to a vehicle speed V detected by an output rotation speed sensor 96; signals indicative of a rotation angle θmg1 (electric angle) and a first electric motor rotation speed Nmg1 that is a rotation speed of the first electric motor MG1, detected by a first electric motor rotation speed sensor 98 made up of a resolver, signals indicative of a rotation angle θmg2 (electric angle) and a second electric motor rotation speed Nmg2 that is a rotation speed of the second electric motor MG2, detected by a second electric motor rotation speed sensor 99 made up of a resolver, signals indicative of a battery temperature THbat, a battery charging/discharging current Ibat, and a battery voltage Vbat of the electric storage device 74 detected by a battery sensor 100; a signal indicative of a rotation angle θp of the shaft 54 corresponding to the actuation state of the parking lock (P lock) in the parking lock device 46 detected by the encoder 52 (see FIG. 2); and a signal indicative of a longitudinal acceleration G of the vehicle 10 detected by a G sensor 106. The electronic control device 80 calculates a charging capacity SOC of the electric storage device 74 based on the battery temperature THbat, the battery charging/discharging current Ibat, and the battery voltage Vbat, for example.

The shift operation position Psh of the shift lever 102 includes, for example, P-, R-, N-, D-operation positions. The P-operation position is an operation position corresponding to the P position of the power transmission device 32 and is the operation position for selecting (or requesting) the P position of the power transmission device 32. The P position of the power transmission device 32 is a parking lock (also referred to as P-lock) position at which the power transmission path in the power transmission device 32 is interrupted (i.e., a power transmission path between the engine 12 and the drive wheels 36 is put into a neutral state making the power transmission impossible) while the rotation of the drive gear 14 is mechanically blocked (locked) by the parking lock device 46. The R-operation position is a backward-running operation position corresponding to an R position of the power transmission device 32. The R position of the power transmission device 32 is a backward-running position at which the power transmission path in the power transmission device 32 is put into a power transmittable state allowing transmission of power for backward running of the vehicle (i.e., the power transmission path between the engine 12 and the drive wheels 36 is formed as the power transmission path for the backward running). The N-operation position is a neutral operation position corresponding to an N position of the power transmission device 32 and is the operation position for selecting (or requesting) the N position of the power transmission device 32. The N position of the power transmission device 32 is a neutral position at which the power transmission path in the power transmission device 32 is interrupted (i.e., the power transmission path between the engine 12 and the drive wheels 36 is put into a neutral state making the power transmission impossible). The D-operation position is a forward-running operation position corresponding to a D position of the power transmission device 32 and is the operation position for selecting (or requesting) the D position of the power transmission device 32. The D position of the power transmission device 32 is a forward-running position at which the power transmission path in the power transmission device 32 is put into a power transmittable state allowing transmission of power for forward running of the vehicle 10 (i.e., the power transmission path between the engine 12 and the drive wheels 36 is formed as the power transmission path for the forward running).

Each of the R, N, and D positions of the power transmission device 32 is a non-P position of the power transmission device 32 at which the state of the P lock by the parking lock device 46 is released. Each of the R-, N-, and D-operation positions is a non-parking operation position (also referred to as a non-P-operation position) corresponding to the non-P position of the power transmission device 32.

The electronic control device 80 outputs, for example, an engine output control command signal Se for the output control of the engine 12, a motor control command signal Smg to the inverter 72 for drive control of the first electric motor MG1 and the second electric motor MG2, and a P-lock switching control command signal Sp for the switching control of the parking lock device 46.

The electronic control device 80 functionally includes a hybrid control means, i.e., a hybrid control portion 110. The hybrid control portion 110 selectively establishes, in accordance with a running state of the vehicle 10, for example, a motor running mode in which the engine 12 is stopped to use only the second electric motor MG2 as a drive source, an engine running mode (normal running mode) in which an engine direct transmission torque is transmitted to the drive gear 14 in which the reaction force to the power of the engine 12 is received by the electric generation of the first electric motor MG1 while the second electric motor MG2 is driven by the electric power generated by the first electric motor MG1 to transmit a torque to the driven gear 18 for running, and an assist running mode in which a driving power of the second electric motor MG2 using the electric power from the electric storage device 74 is also added for running in the engine running mode. For example, the hybrid control portion 110 causes the engine 12 to operate in an efficient operation range, while optimally changing the ratio of the driving power between the engine 12 and the second electric motor MG2 and the reaction force due to the electric power generation of the first electric motor MG1 so as to control a transmission ratio γ0 (engine rotation speed Ne/output rotation speed Nout) in the power transmission device 32.

When the shift operation position Psh is switched to the P-operation position by a driver, the hybrid control portion 110 outputs the P-lock switching control command signal Sp for switching the shift position of the power transmission device 32 to the P position. In this case, the hybrid control portion 110 stops the first electric motor MG1 and the second electric motor MG2 to control the power transmission device 32 into a power-transmission interrupted state (neutral state) and, when the vehicle speed V becomes equal to or less than a predetermined vehicle speed, actuates the parking lock device 46 to mesh the tooth 62a of the lock pole 62 with the parking gear 60 so as to stop the rotation of the rotary members constituting the power transmission path from the drive gear 14 to the drive wheels 36, thereby stopping the vehicle 10. In this case, the hybrid control portion 110 stops the engine 12 when the charging capacity SOC of the electric storage device 74 is equal to or greater than a predetermined value, and drives the engine 12 to provide regenerative control of the first electric motor MG1 when the charging capacity SOC is less than the predetermined value. Even when the charging capacity SOC of the electric storage device 74 is equal to or greater than the predetermined value, the hybrid control portion 110 allows the engine 12 to perform a self-sustaining operation (idle operation) at a preset idle rotation speed Neidle if it is determined that warm-up of the engine 12 or a catalyst temperature must be maintained.

It is known that when the shift position of the power transmission device 32 is set to the P position and the engine 12 is allowed to perform the idle operation while the parking lock device 46 is actuated to the P-lock side, a gear rattle noise occurs due to rattling between gears attributable to a torque fluctuation of the engine 12. The gear rattle noise particularly notable in the vehicle 10 is the noise due to rattling generated at a backlash (gap) in a meshing portion 108 (see FIG. 1) between the drive gear 14 and the driven gear 18 and the noise due to rattling generated at a backlash (gap) in a meshing portion 109 (see FIG. 1) between the parking gear 60 and the lock pole 62.

To suppress the gear rattle noise, the electronic control device 80 includes a vehicle state determining mean, i.e., a vehicle state determining portion 111, a backlash elimination control means, i.e., a backlash elimination control portion 112, a P-meshing state determining means, i.e., a P-meshing state determining portion 114, a P-meshing position learning means, i.e., a P-meshing position learning portion 116, and a braking control means, i.e., a braking control portion 118. The backlash elimination control portion 112 corresponds to a control portion of the present invention; the P-meshing state determining portion 114 corresponds to a determining portion of the present invention; and the P-meshing position learning portion 116 corresponds to a learning portion of the present invention.

The vehicle state determining portion 111 determines whether the shift position of the power transmission device 32 is switched to the P position. The vehicle state determining portion 111 determines whether the power transmission device 32 is switched to the P position, based on whether a rotation angle θp of the shaft 54 based on a pulse signal input from the encoder 52 has reached a preset rotation angle θpp corresponding to the P position.

Figure 4A:
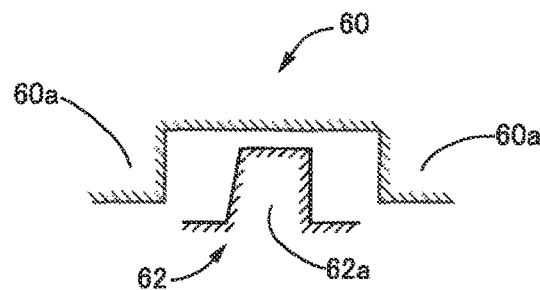
FIG. 4A is a diagram of a meshing state between teeth of a parking gear and a tooth of a parking lock pole in the parking lock device of FIG. 2.
Figure 4B:
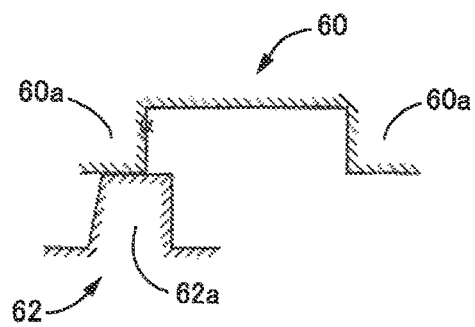
FIG. 4B is a diagram of a non-meshing state between the teeth of the parking gear and the tooth of the parking lock pole in the parking lock device of FIG. 2.

The P-meshing state determining portion 114 determines during the idle operation of the engine 12 with the shift position of the power transmission device 32 set to the P position whether the tooth 62a of the lock pole 62 is meshed with the parking gear 60 constituting the parking lock device 46 so that a meshing state (a meshing state of the parking lock device 46) is achieved, or is not meshed with the parking gear 60 so that a non-meshing state (a non-meshing state of the parking lock device 46) is achieved. FIG. 4A shows a state in which the tooth 62a of the lock pole 62 is meshed with the parking gear 60, and FIG. 4B shows a state in which the tooth 62a of the lock pole 62 is not meshed with the parking gear 60. In the meshing state of the parking lock device 46 shown in FIG. 4A, the tooth 62a of the lock pole 62 has entered a valley formed between the teeth 60a of the parking gear 60. In the non-meshing state of the parking lock device 46 shown in FIG. 4B, a tip of the tooth 60a of the parking gear 60 and a tip of the tooth 62a of the lock pole 62 are in contact with each other. In FIG. 4A, a gap in a circumferential direction (left-right direction on the plane of FIG. 4A) formed between the adjacent teeth 60a of the parking gear 60 and the tooth 62a of the lock pole 62 is the backlash (gap) in the meshing portion 109 between the parking gear 60 and the lock pole 62. Since this backlash is formed, the gear rattle noise is generated by the teeth 60a and the tooth 62a repeatedly colliding with each other when the torque fluctuation of the engine 12 is input.

The P-meshing state determining portion 114 detects a rotation angle θgear of the parking gear 60 (i.e., the rotation angle θgear of the drive gear 14) and determines that the parking lock device 46 is in the meshing state if the detected rotation angle θgear is within a preset mesh range (θgear1 to θgear2) or is in the non-meshing state if the rotation angle θgear is not in the mesh range. In the mesh range (θgear1 to θgear2) of the rotation angle θgear of the parking gear 60, as shown in FIG. 4A, the tooth 62a of the lock pole 62 is in the meshing state of being meshed with the parking gear 60. In the meshing state of FIG. 4A, the tooth 60a of the parking gear 60 is in contact with the respective tooth 62a of the lock pole 62 at the threshold value (θgear1, θgear2) of the mesh range. Specifically, when the tooth 62a of the lock pole 62 comes into contact with one of the teeth 60a of the parking gear 60 located on both sides, the rotation angle θgear of the parking gear 60 is the lower limit threshold value θgear1, for example, and when the tooth 62a of the lock pole 62 comes into contact with the other one of the teeth 60a of the parking gear 60, the rotation angle θgear of the parking gear 60 is the upper limit threshold value θgear2, for example. Since the multiple teeth 60a of the parking gear 60 are periodically formed in the circumferential direction, the mesh range is also periodically distributed in the circumferential direction. This mesh range (θgear1 to θgear2) is obtained through an experiment or design and stored in advance.

The P-meshing state determining portion 114 calculates the rotation angle θgear of the parking gear 60 based on the rotation angle θmg2 of the second electric motor MG2. Since the second electric motor MG2 and the parking gear 60 are mechanically coupled via the reduction gear 22 and the driven gear 18, the rotation angle θgear of the parking gear 60 is uniquely obtained by detecting the rotation angle θmg2 of the second electric motor MG2. Therefore, the P-meshing state determining portion 114 detects the rotation angle θmg2 of the second electric motor MG2, calculates the rotation angle θgear of the parking gear 60 from the detected rotation angle θmg2, and determines whether the parking lock device 46 is in the meshing state or the non-meshing state based on the calculated rotation angle θgear. Since the second electric motor rotation speed sensor 99 is included in the second electric motor MG2, an additional sensor for detecting the rotation angle θgear of the parking gear 60 is unnecessary.

The P-meshing position learning portion 116 learns the lower limit threshold value θgear1 and the upper limit threshold value θgear2 (referred to as the upper/lower limit threshold values θgear1, θgear2 if not particularly distinguished) of the mesh range (θgear1 to θgear2) in which the parking lock device 46 is in the meshing state. The upper/lower limit threshold values θgear1, θgear 2 also vary depending on individual variation of each vehicle 10 and changes over time (due to wear etc.) unique to each vehicle 10. Therefore, the P-meshing position learning portion 116 learns and updates the upper/lower limit threshold values θgear1, θgear2 at which the parking lock device 46 enters the meshing state as needed so as to prevent deterioration in accuracy of determination of the meshing state.

When the vehicle is stopped with the shift position of the power transmission device 32 set to the P position on uphill and downhill roads, the P-meshing position learning portion 116 learns the upper/lower limit threshold values θgear1, θgear2 that are threshold values of the rotation angle θgear of the parking gear 60 at which the parking lock device 46 enters the meshing state, based on the rotation angle θgear of the parking gear 60 at that time. For example, when the vehicle is stopped with the power transmission device 32 set to the P position on an uphill road, the vehicle 10 stops after moving due to the vehicle's own weight to the position at which one of the teeth 60a of the parking gear 60 (hereinafter referred to as tooth 60a) and the tooth 62a of the lock pole 62 come into contact with each other, i.e., the position at which the backlash is eliminated in the meshing portion 109 between the tooth 60a of the parking gear 60 and the tooth 62a of the lock pole 62. In other words, the parking gear 60 is rotated to a position corresponding to one of the upper/lower limit threshold values θgear1, θgear2. It is determined in design that the gear is rotated to a position corresponding to one of the lower limit threshold value θgear1 and the upper limit threshold value θgear2 on each of uphill and downhill roads. Therefore, the P-meshing position learning portion 116 learns one of the lower limit threshold value θgear1 and the upper limit threshold value θgear2 for each of uphill and downhill roads, and updates the learned one of the lower limit threshold value θgear1 and the upper limit threshold value θgear2 as a new determination value.

For example, when the lower limit threshold value θgear1 is learned, the other periodically distributed lower limit threshold values θgear1 may also be learned by reflecting the learned lower limit threshold value θgear1 (learning value). Similarly, when the upper limit threshold value θgear2 is learned, the other periodically distributed upper limit threshold values θgear2 may also be learned by reflecting the learned upper limit threshold value θgear2 (learning value). For example, when the lower limit threshold value θgear1 is learned, the upper limit threshold value θgear2 correlated with the lower limit threshold value θgear1 may also be learned by reflecting the leaned lower limit threshold value θgear1 (learning value). Similarly, when the upper limit threshold value θgear2 is learned, the lower limit threshold value θgear1 correlated with the upper limit threshold value θgear2 may also be learned by reflecting the learned upper limit threshold value θgear2 (learning value).

The P-meshing position learning portion 116 corrects (changes) the upper/lower limit threshold values θgear1, θgear2 of the rotation angle θgear of the parking gear 60 at which the parking lock device 46 enters the meshing state according to a road surface gradient θw (grade) of uphill and downhill roads. For example, when the road surface gradient θw of the roads changes, a change also occurs in the rotation angle θgear of the parking gear 60 when the backlash is eliminated, i.e., the learning value of the upper/lower limit threshold values θgear1, θgear2 of the rotation angle θgear of the parking gear 60, due to the rigidity of the drive gear 14 etc. This is taken into consideration when the P-meshing position learning portion 116 corrects the learning value according to the road surface gradient θw. The P-meshing position learning portion 116 preliminarily stores a map of relationship between the road surface gradient θw and a correction coefficient α as shown in FIG. 5, for example, and applies the road surface gradient θw to the relationship map to determine the correction coefficient α and corrects the learning value by multiplying the learned value (upper/lower limit threshold values θgear1, θgear2) by the determined correction coefficient α.

Figure 5:
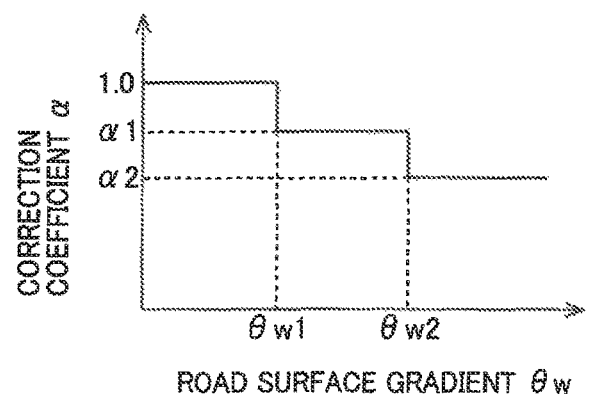
FIG. 5 is a relationship map showing a relationship with a correction coefficient applied when learning a threshold value of a mesh range using a road surface gradient as a parameter.

As in the relationship map of FIG. 5, for example, the correction coefficient α is set in three stages according to the road surface gradient θw, and the correction coefficient α is set to 1.0 in the range of the road surface gradient θw from zero to a predetermined value θw1, is set to a value α1 smaller than 1.0 in the range of the road surface gradient θw from the predetermined value θw1 to a predetermined value θw2, and is set to a value α2 smaller than the value α1 when the road surface gradient θw exceeds the predetermined value θw2. The relationship map of FIG. 5 is merely an example, and the correction coefficient α may more finely be set according to the road surface gradient θw, or the correction coefficient α may be stored as a function of the road surface gradient θw. The relationship map of FIG. 5 is set for each of uphill and downhill roads.

Whether a road having the vehicle stopped thereon is an uphill road or a downhill road, and the road surface gradient θw in the case of the uphill road or the downhill road are determined based on the longitudinal acceleration G detected by the G sensor 106. For example, when the road surface gradient θw of the uphill road increases, the longitudinal acceleration G decreases with respect to a reference acceleration Gs at the road surface gradient θw of zero, and when the road surface gradient θw of the downhill road increases, the longitudinal acceleration G increases with respect to the reference acceleration Gs. From the above, whether the road is an uphill road or a downhill road is determined based on whether the longitudinal acceleration G detected during running is smaller than the reference acceleration Gs. A relationship map of the road surface gradient θw to the longitudinal acceleration G during running is preliminarily obtained and stored, and the road surface gradient θw during running is determined by applying the detected longitudinal acceleration G to the relationship map. Since the G sensor 106 is an existing sensor, it is not necessary to add a sensor etc. for determining the road surface gradient θw.

When the P-meshing state determining portion 114 determines that the parking lock device 46 is in one of the meshing state and the non-meshing state then, the backlash elimination control portion 112 provides backlash elimination control of suppressing rattling according to the meshing state and the non-meshing state. Description will first be made of the control when it is determined that the parking lock device 46 is in the meshing state.

When it is determined that the parking lock device 46 is in the meshing state, the backlash elimination control portion 112 provides the backlash elimination control of applying a torque Tmg2 of the second electric motor MG2 to the drive gear 14 so as to eliminate a backlash (gap) in a meshing portion between gears formed on a power transmission path from the second electric motor MG2 to the parking lock device 46. When the torque Tmg2 is output from the second electric motor MG2, the torque Tmg2 is transmitted through the reduction gear 22, the driven gear 18, the final gear pair 28, and the differential gear device 30 to the pair of the right and left axles 34, so that the axles 34 are twisted. In this case, the drive gear 14 meshing with the driven gear 18 and the parking gear 60 are rotated by an amount of displacement due to twisting of the axles 34, so that the parking gear 60 is displaced to a position of contact between the tooth 60*a* of the parking gear 60 and the tooth 62*a* of the lock pole 62. When the tooth 60*a* of the parking gear 60 and the tooth 62*a* of the lock pole 62 come into contact with each other, the parking gear 60 stops rotating, and the reaction force (torque reaction force) of the torque Tmg2 of the second electric motor MG2 is received by the lock pole 62. Therefore, the torque Tmg2 of the second electric motor MG2 is transmitted through the reduction gear 22, the driven gear 18, the drive gear 14, and the parking gear 60 to the lock pole 62, so that the backlash in the meshing portion 108 between the drive gear 14 and the driven gear 18 and the backlash in the meshing portion 109 between the parking gear 60 and the lock pole 62 are respectively eliminated. Therefore, the gear rattle noise due to rattling generated in these meshing portions 108, 109 is suppressed.

The torque Tmg2 output from the second electric motor MG2 during the backlash elimination control is calculated by following Eq. (1). In Eq. (1), Tac corresponds to a torque necessary for maintaining the backlash-eliminated state (preventing the tooth 60*a* of the parking gear 60 and the tooth 62*a* of the lock pole 62 from separating) even when torque fluctuation is input from the engine 12, and is obtained through an experiment or design in advance. Tds corresponds to a torque necessary for eliminating the backlash (backlash elimination torque), i.e., a torque necessary for the rotation (the twisting of the axle 34) to the position at which the tooth 60*a* of the parking gear 60 comes into contact with the tooth 62*a* of the lock pole 62. For example, when the rigidity of the axles 34 is low, the axles 34 are easily twisted, and the displacement becomes larger when a certain torque is applied, so that the torque Tds may be made smaller. When a backlash amount (gap) between the tooth 60*a* of the parking gear 60 and the tooth 62*a* of the lock pole 62 is smaller, the rotation amount (displacement amount) of the parking gear 60 becomes smaller, so that the torque Tds may be made smaller when the backlash amount is smaller. Considering the rigidity of the axles 34 and the backlash amount (gap) between the tooth 60*a* of the parking gear 60 and the tooth 62*a* of the lock pole 62, the minimum torque Tds is calculated within the range in which the backlash can be eliminated. The amount of backlash to be eliminated between the tooth 60*a* of the parking gear 60 and the tooth 62*a* of the lock pole 62 changes depending on the rotation angle θgear of the parking gear 60 and, therefore, the torque Tds is varied depending on the rotation angle θgear of the parking gear 60. For example, the backlash elimination control portion 112 stores a preliminarily obtained relationship map using the rotation angle θgear of the parking gear 60 and the torque Tds, applies the rotation angle θgear of the parking gear 60 to the relationship map to obtain the torque Tds corresponding to the rotation angle θgear, and calculates the torque Tmg2 output from the second electric motor MG2 based on Eq. (1).

$$Tmg2=Tac+Tds \qquad (1)$$

Description will be made of the control when it is determined by the P-meshing state determining portion 114 that the parking lock device 46 is in the non-meshing state. When it is determined that the parking lock device 46 is in the non-meshing state, the backlash elimination control portion 112 provides the backlash elimination control of applying a torque Tmg1 of the first electric motor MG1 to the drive gear 14 so as to eliminate a backlash (gap) in a meshing portion between gears constituting a power transmission path (power transmission system) from the first electric motor MG1 to the drive wheels 36. In the non-meshing state, the tooth 62*a* of the lock pole 62 is not meshed with the parking gear 60 as shown in FIG. 4B, and therefore, it is difficult to receive the reaction force of the torque Tmg2 of the second electric motor MG2 with the lock pole 62. Additionally, in the non-meshing state, the rattling due to torque fluctuation does not occur in the meshing portion 109 between the teeth 60*a* of the parking gear 60 and the tooth 62*a* of the lock pole 62. Therefore, if it is determined that the parking lock device 46 is in the non-meshing state, the backlash elimination control portion 112 provides the backlash elimination control by applying the torque Tmg1 of the first electric motor MG1. The torque Tmg1 output from the first electric motor MG1 is transmitted through the power distribution mechanism 16, the counter gear pair 20, the final gear pair 28, and the differential gear device 30 to the pair of the right and left axles 34, so that the backlash (gap) is eliminated in the meshing portion between the gears constituting the power transmission path from the first electric motor MG1 to the axles 34. Therefore, the backlash is also eliminated in the meshing portion 108 between the drive gear 14 and the driven gear 18, and the gear rattle noise due to rattling generated in the meshing portion 108 is also suppressed. An amount of the torque Tmg1 output from the first electric motor MG1 is obtained through an experiment or design in advance and is set to a minimum magnitude in a range in which the backlash-eliminated gears do not separate each other with respect to the torque fluctuation of the engine 12.

The backlash elimination control portion 112 also outputs the torque Tmg2 from the second electric motor MG2 concurrently with the application of the torque of the first electric motor MG1 performed when the parking lock device 46 is determined as being in the non-meshing state, and thereby eliminates the backlash in a meshing portion between the reduction gear 22 and the driven gear 18. As a result, the gear rattle noise due to rattling generated in this meshing portion is suppressed.

Even when the engine 12 is in the idle operation state and the shift position is at the non-P position other than the P position, the backlash elimination control portion 112 applies the torque Tmg1 of the first electric motor MG1 to the drive gear 14 to eliminate the backlash. When the shift position is at the non-P position, no gear rattle noise occurs due to rattling in the meshing portion 109 between the parking gear 60 and the lock pole 62, and this is not substantially different from the non-meshing state. Therefore, as in the non-meshing state of the parking lock device 46, the backlash elimination control is provided through the torque Tmg1 of the first electric motor MG1 so as to suppress the gear rattle noise due to rattling.

In coordination with the backlash elimination control by the backlash elimination control portion 112, the braking control portion 118 actuates the brake device 40 to generate the brake force Fbr (braking force). While the backlash elimination control portion 112 is providing the backlash elimination control, the vehicle 10 may move when the torque of the electric motor applying the torque is transmitted to the axles 34. Therefore, during provision of the backlash elimination control (during application of the torque of the first electric motor MG1 or the second electric motor MG2), the braking control portion 118 actuates the brake device 40 for inhibiting the movement of the vehicle 10 to generate the brake force Fbr at a magnitude that inhibits the movement of the vehicle 10 so as to prevent the vehicle 10 from moving. The brake force Fbr is obtained through an experiment or design in advance and is changed depending on whether the parking lock device 46 is in the meshing state or the non-meshing state and the magnitude of the torque of the electric motor providing the backlash elimination control.

Figure 6:
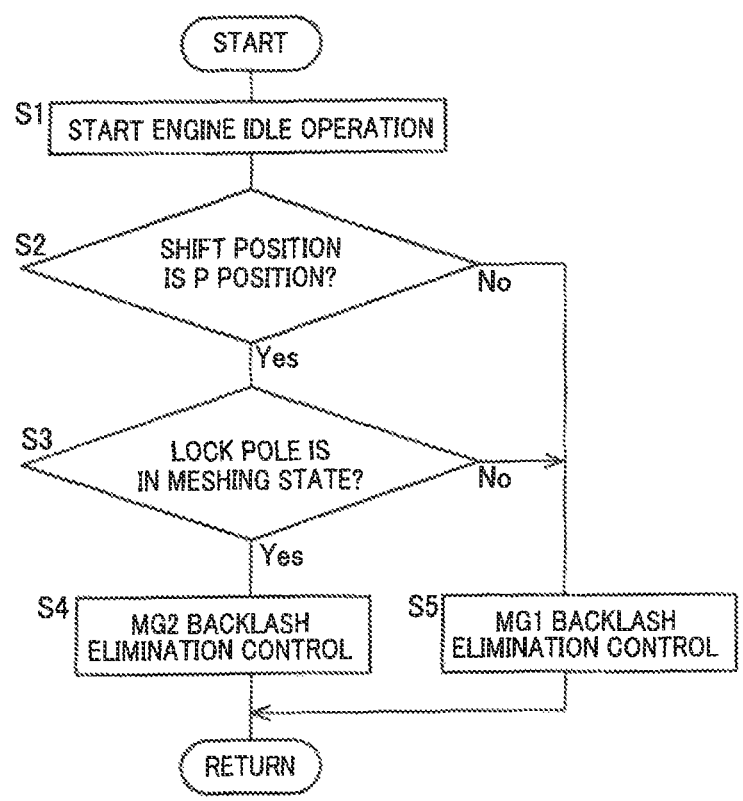
FIG. 6 is a flowchart for explaining a main portion of the control operation of the electronic control device shown in FIG. 3, i.e., a control operation of suppressing the gear rattle noise generated when the shift position is set to the parking position (P position) during an idle operation of an engine.

FIG. 6 is a flowchart for explaining a main portion of the control operation of the electronic control device 80, i.e., a control operation of suppressing the gear rattle noise generated when the power transmission device 32 is set to the P position during the idle operation of the engine 12. This flowchart is executed when the idle operation of the engine 12 is started for the purpose of warm-up, for example.

First, at step S1 (hereinafter, step will be omitted) corresponding to the control function of the hybrid control portion 110, the idle operation of the engine 12 is started due to warm-up etc. At S2 corresponding to the vehicle state determining portion 111, it is determined whether the shift position of the power transmission device 32 is the P position. If S2 is negative, the flow goes to S5 described later. If S2 is affirmative, it is determined at S3 corresponding to the control function of the P-meshing state determining portion 114 whether the parking lock device 46 is in the meshing state.

If S3 is affirmative, the backlash elimination control is provided by applying the torque Tmg2 of the second electric motor MG2 to the drive gear 14 at S4 corresponding to the control function of the backlash elimination control portion 112. If S3 is negative, the backlash elimination control is provided by applying the torque Tmg1 of the first electric motor MG1 to the drive gear 14 at S5 corresponding to the control function of the backlash elimination control portion 112.

Figure 7:
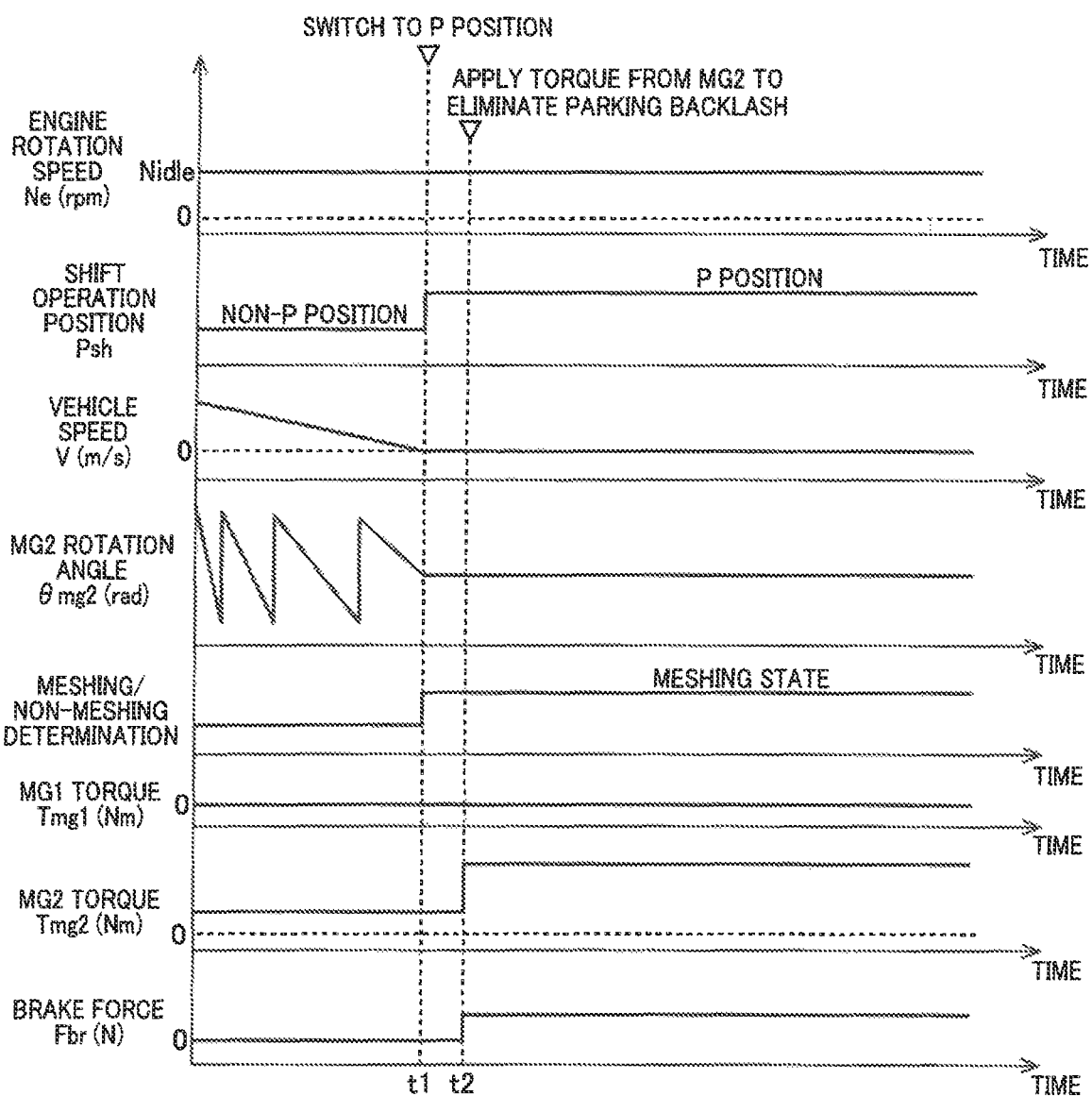
FIG. 7 is an example of a time chart showing an operation state when the backlash elimination control is provided based on the flowchart of FIG. 6 and shows the operation state when it is determined that the parking lock device is in the meshing state.

FIG. 7 is an example of a time chart showing an operation state when the backlash elimination control is provided based on the flowchart of FIG. 6 and shows the operation state when it is determined that the parking lock device 46 is in the meshing state (corresponding to S4 of FIG. 6).

In FIG. 7, before time t1, the engine 12 is decelerated with the idle operation state. When the shift position of the power transmission device 32 is switched to the P position at time t1, the vehicle speed V becomes zero and the vehicle is stopped. In this state, it is determined that the rotation angle θgear of the parking gear 60 is within the mesh range (θgear1 to θgear2), and therefore, the parking lock device 46 is determined as being in the meshing state. At time t2, since the parking lock device 46 is determined as being in the meshing state, the backlash elimination control is started with applying the torque Tmg2 of the second electric motor MG2 to the drive gear 14. In this case, the reaction force of the torque Tmg2 of the second electric motor MG2 is received by the lock pole 62, and the backlashes are eliminated in the meshing portion 109 between the parking gear 60 and the lock pole 62 and in the meshing portion 108 between the drive gear 14 and the driven gear 18, so that the gear rattle noise due to rattling generated in these meshing portions is suppressed. In coordination with the backlash elimination control by the second electric motor MG2, the brake device 40 is actuated at time t2 and the brake force Fbr is applied to the drive wheels 36, and the vehicle 10 is thereby prevented from moving.

Figure 8:
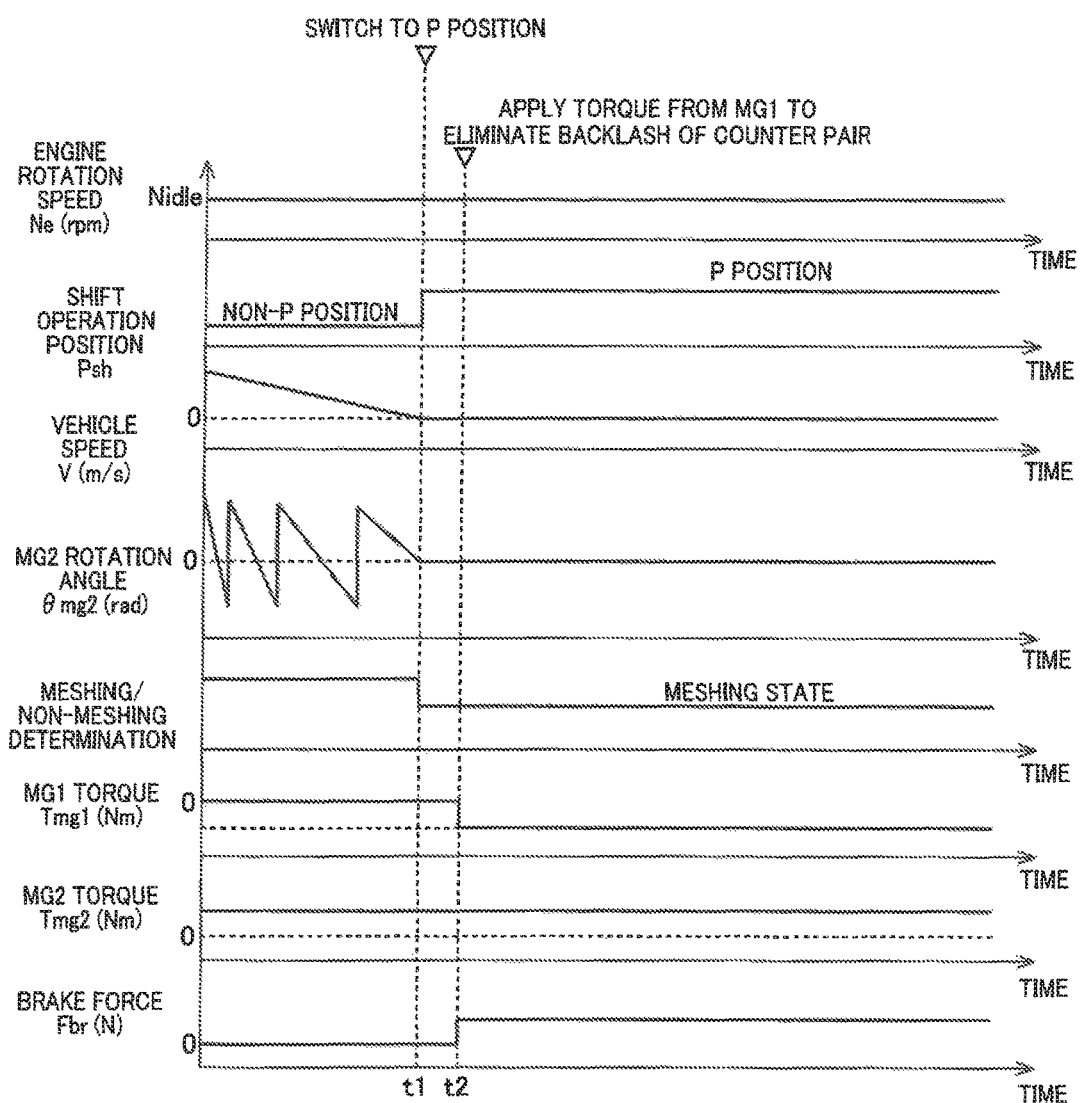
FIG. 8 is an example of a time chart showing an operation state when the backlash elimination control is provided based on the flowchart of FIG. 6 and shows the operation state when it is determined that the parking lock device is in the non-meshing state.

FIG. 8 is an example of a time chart showing an operation state when the backlash elimination control is provided based on the flowchart of FIG. 6 and shows the operation state when it is determined that the parking lock device 46 is in the non-meshing state (corresponding to S5 of FIG. 6).

In FIG. 8, before time t1, the engine 12 is decelerated with the idle operation state. When the shift position of the power transmission device 32 is switched to the P position at time t1, the vehicle speed V becomes zero and the vehicle is stopped. In this state, it is determined that the rotation angle θgear of the parking gear 60 is out of the mesh range (θgear1 to θgear2), and therefore, the parking lock device 46 is determined as being in the non-meshing state. At time t2, since the parking lock device 46 is determined as being in the non-meshing state, the backlash elimination control is started with applying the torque Tmg1 of the first electric motor MG1 to the drive gear 14. In this case, the torque Tmg1 of the first electric motor MG1 is transmitted to the pair of the right and left axles 34, so that the backlash is eliminated in the meshing portion of the gears constituting the power transmission path (power transmission system) from the first electric motor MG1 to the axle 34. Therefore, the backlash is eliminated in the meshing portion 108 between the drive gear 14 and the driven gear 18 constituting the counter gear pair 20, and the gear rattle noise due to rattling generated in the meshing portion 108 is suppressed.

As described above, according to this example, although in the non-meshing state of the parking lock device 46, the backlash cannot be eliminated in the meshing portion between the gears in the power transmission system by applying the torque Tmg2 to the drive gear 14 by the second electric motor MG2 and in the meshing state of the parking lock device 46, the backlash cannot be eliminated in the meshing portion 109 between the parking gear 60 and the lock pole 62 by applying the torque Tmg1 to the drive gear 14 by the first electric motor MG1, the electric motor applying the torque to the drive gear 14 can be switched depending on whether the parking lock device 46 is in the meshing state or the non-meshing state, so as to properly eliminate the backlashes in the meshing portion between the gears in the power transmission system and in the meshing portion 109 between the parking gear 60 and the lock pole 62 and to properly suppress the gear rattle noise due to rattling.

According to this example, the rotation angle θgear of the parking gear 60 can be obtained based on the rotation angle θmg2 of the second electric motor MG2 without adding a sensor etc. for detecting the rotation angle θgear of the parking gear 60, and it can be determined whether the parking lock device 46 is in the meshing state or the non-meshing state, based on the rotation angle θgear of the parking gear 60.

According to this example, when the vehicle stops with the shift position of the power transmission device 32 set to the P position on uphill and downhill roads, the upper/lower limit threshold values θgear1, θgear2 of the rotation angle θgear of the parking gear 60 resulting in the meshing state of the parking lock device 46 are learned based on the rotation angle θgear of the parking gear 60 at that time, and therefore, even when an amount of backlash has changed due to gear wear etc., the upper/lower limit threshold values θgear1, θgear2 of the rotation angle θgear of the parking gear 60 resulting in the meshing state are newly learned, so that whether the parking lock device 46 is in the meshing state or the non-meshing state can accurately be determined regardless of temporal changes. Additionally, considering the fact that the rotation angle θgear resulting in the meshing state between the parking gear 60 and the lock pole 62 varies depending on the road surface gradient θw of the uphill and downhill roads, the learning value of the parking gear 60 resulting in the meshing state between the parking gear 60 and the lock pole 62 is corrected depending on the road surface gradient θw, so that the accuracy can further be improved in determination on whether the parking lock device 46 is in the meshing state or the non-meshing state.

According to this example, when it is determined that the parking lock device 46 is in the meshing state, the torque Tmg2 of the second electric motor MG2 is varied in consideration of the rigidity of the parking gear 60 and the backlash amount (gap) in the meshing portion 109 between the parking gear 60 and the lock pole 62, so that the torque Tmg2 of the second electric motor MG2 can be minimized within the range in which rattling is suppressed, so as to reduce deterioration in fuel consumption due to the backlash elimination.

According to this example, while the torque Tmg1, Tmg2 of the first electric motor MG1 or the second electric motor MG2 is applied to the drive gear 14, the brake device 40 for inhibiting the vehicle movement is actuated, so that the vehicle can be prevented from moving against an intention of a driver.

Although the example of the present invention has been described in detail with reference to the drawings, the present invention is also applicable to other forms.

For example, in the example, whether the parking lock device 46 is in the meshing state or the non-meshing state is determined based on the rotation angle θgear acquired by calculating the rotation angle θgear of the parking gear 60 from the rotation angle θmg2 of the second electric motor MG2 detected by the second electric motor rotation speed sensor 99; however, the present invention is not limited thereto. For example, a gap sensor detecting the position of the tooth 62a of the lock pole 62 may be disposed so as to make the determination based on whether the position of the tooth 62a has reached the position resulting in the meshing state. Alternatively, a sensor detecting a rotation angle of a rotary portion of the lock pole 62 may be disposed so as to make the determination based on whether the rotation angle of the lock pole 62 has reached a predetermined angle resulting in the meshing state.

A sensor detecting a strain amount of the lock pole 62 may be disposed to determine whether the meshing state is entered, based on whether the strain amount is equal to or less than a predetermined value set in advance. When the parking lock device 46 enters the non-meshing state, the strain amount of the lock pole 62 increases, and therefore, the meshing state or the non-meshing state can be determined by detecting the strain amount of the lock pole 62.

Whether the parking lock device 46 is in the meshing state may be determined based on whether a current value of the P-lock drive motor 50 constituting the parking lock device 46 is equal to or less than a predetermined value. When the parking lock device 46 enters the non-meshing state, the current value rises due to an increase in load applied to the P-lock drive motor 50, and therefore, the meshing state or the non-meshing state can be determined by detecting the current value. The meshing state or the non-meshing state may be determined based on the pulse signal of the encoder 52 detecting the rotation angle θp of the P-lock drive motor 50.

In the example, the P-meshing position learning portion 116 determines whether a road is an uphill road or a downhill road, as well as the road surface gradient θw, based on the longitudinal acceleration G detected by the G sensor 106; however, the present invention is not limited thereto. For example, an additional device such as a level gauge or a gradient meter may be used for directly detecting whether a road is an uphill road or a downhill road, as well as the road surface gradient θw.

Although the ring gear R of the power distribution mechanism 16 and the drive gear 14 are integrally formed in the example, the ring gear R and the drive gear 14 may be made up of separate bodies.

Although the brake force Fbr is applied to the drive wheels 36 by the braking control portion 118 in coordination with the backlash elimination control portion 112 in the example, the brake force Fbr may not necessarily be applied to the drive wheels 36 by the braking control portion 118.

The above description is merely an embodiment and the present invention can be implemented in variously modified and improved forms based on the knowledge of those skilled in the art.

REFERENCE SIGNS LIST

10: Hybrid vehicle (Vehicle)
12: Engine
14: Counter drive gear (Rotary member)
16: Power distribution mechanism (Differential mechanism)
36: Drive wheels
40: Brake device (Braking device)
60: Parking gear
62: Parking lock pole (Lock member)
80: Electronic control device (Control device)
112: Backlash elimination control portion (Control portion)
114: P-meshing state determining portion (Determining portion)
116: P-meshing position learning portion (Learning portion)
118: Braking control portion
MG1: First electric motor (Differential electric motor)
MG2: Second electric motor (Running electric motor)

What is claimed is:

1. A control device of a hybrid vehicle that includes a differential mechanism distributing a power from an engine to a differential electric motor and drive wheels, a rotary member transmitting a power from the differential mechanism to the drive wheels, and a running electric motor coupled in a power transmittable manner between the rotary member and the drive wheels and that is provided with a parking gear preventing rotation in a power transmission system from the rotary member to the drive wheels when a shift position is at a parking position since a lock member is meshed with the parking gear, the control device comprising:

a determining portion configured to determine, during idle operation of the engine with the shift position set to the parking position, whether a meshing state is achieved in which the lock member is meshed with the parking gear, or a non-meshing state is achieved in which the lock member is not meshed with the parking gear; and a control portion configured to provide a control of applying a torque of the running electric motor to the rotary member to eliminate a gap in a meshing portion between gears in the power transmission system and a gap in a meshing portion between the parking gear and the lock member when it is determined that the meshing state is achieved, and to provide a control of applying a torque of the differential electric motor to the rotary member to eliminate a gap in the meshing portion between gears in the power transmission system when it is determined that the non-meshing state is achieved.

2. The control device of a hybrid vehicle according to claim 1, wherein the determining portion calculates a rotation angle of the rotary member based on a rotation angle of the running electric motor and determines whether the meshing state or the non-meshing state is achieved based on the rotation angle of the rotary member.

3. The control device of a hybrid vehicle according to claim 1, further comprising a learning portion configured to learn a rotation angle of the rotary member at which the parking gear and the lock member enter the meshing state, based on a rotation angle of the rotary member when the vehicle stops with the shift position set to the parking position on uphill and downhill roads.

4. The control device of a hybrid vehicle according to claim 3, wherein the learning portion corrects the rotation angle of the rotary member at which the parking gear and the lock member enter the meshing state, depending on a road surface gradient of the uphill and downhill roads.

5. The control device of a hybrid vehicle according to claim 1, wherein when it is determined that the parking gear and the lock member are in the meshing state, the control portion varies the torque applied from the running electric motor in consideration of rigidity of the rotary member and a gap in the meshing portion between the parking gear and the lock member.

6. The control device of a hybrid vehicle according to claim 1, further comprising a braking control portion configured to actuate a braking device for inhibiting movement of the vehicle while the torque of the running electric motor or the differential electric motor is applied to the rotary member.

* * * * *